United States Patent

Morgan

[15] 3,672,573
[45] June 27, 1972

[54] DISHWASHER SPRAY ARM WITH INTEGRAL BEARING

[72] Inventor: Wendell D. Morgan, Marion, Ill.

[73] Assignee: Fedders Corporation, Edison, N.J.

[22] Filed: March 3, 1971

[21] Appl. No.: 120,555

[52] U.S. Cl. .......................... 239/261, 239/264, 239/600, 285/419
[51] Int. Cl. .................................................. B05b 3/06
[58] Field of Search .................... 239/251, 261, 264, 600; 285/190, 419, 373

[56] References Cited

UNITED STATES PATENTS

| | | | |
|---|---|---|---|
| 2,560,833 | 7/1951 | Wagner | 239/261 X |
| 2,905,393 | 9/1959 | Federighi et al. | 239/261 X |
| 3,444,870 | 5/1969 | Lyman | 239/251 X |

Primary Examiner—M. Henson Wood, Jr.
Assistant Examiner—John J. Love
Attorney—Kane, Dalsimer, Kane, Sullivan & Kurucz

[57] ABSTRACT

An upstanding water post in a dishwasher has a cylindrical outer surface with an outwardly-extending circumferential flange. First and second hollow members molded from plastic, each having a bottom wall, a portion of which is horizontal, and an opening at one end defined partially by the inner edge of a vertical abutting surface and partially by the inner edge of a cylindrical surface formed in the horizontal portion of the bottom wall. The cylindrical surfaces of the first and second members have a horizontal bearing slot formed therein, and the members are positioned so that the bearing slots receive the outwardly-extending flange of the water post to provide a bearing for rotatably supporting the members. The first and second members are sealed together by a tongue and groove molded in the abutting surfaces of the respective members.

10 Claims, 5 Drawing Figures

PATENTED JUN 27 1972 3,672,573

INVENTOR
WENDELL D. MORGAN
BY
Kane, Dalsimer, Kane, Sullivan & Kurucz
ATTORNEYS

INVENTOR
WENDELL D. MORGAN

DISHWASHER SPRAY ARM WITH INTEGRAL BEARING

BACKGROUND OF THE INVENTION

1. Field of the Invention

This invention relates generally to spray apparatus and more particularly to a molded plastic spray arm having a bearing formed integrally therewith.

2. Description of the Prior Art

Heretofore, spray arms of dishwasher spray apparatus were rotatably attached to a water post by the use of a separate bearing member. Most prior art devices utilized a one-piece metal spray arm which was expensive to manufacture and did not facilitate easy mounting to the water post. Other prior art devices utilized two-piece spray arms formed from two halves connected by a hub which was mounted to the water post by a separate bearing member. The two-piece spray arms were somewhat easier to manufacture; however, the mounting entailed the same difficulties as those experienced with a one-piece spray arm.

SUMMARY OF THE INVENTION

The present invention contemplates a spray apparatus having a hollow water post mounted in an upstanding position on the bottom of a wash chamber of a dishwasher. The water post has a first opening adjacent the bottom, a second opening formed in the uppermost end and a cylindrical outer surface formed about the uppermost end. An outwardly-extending circumferential flange is formed around the cylindrical outer surface of said water post. Two hollow elongated members, each having an opening at one end, are molded from plastic. The plastic members each have a top wall with spray openings formed therein and a bottom wall at least a portion of which lies in a horizontal plane. The opening, at one end of each member, is defined partially by an inner edge of a vertical abutting surface and partially by an inner edge of a cylindrical surface formed in the horizontal portion of the bottom wall. A bearing slot is formed in the cylindrical surfaces of the plastic members so as to receive the outwardly-extending flange formed on the water post. The abutting surface of one of said plastic members has a tongue formed thereon and the abutting surface of the other of said plastic members has a groove formed therein for receiving the tongue of the other member. The abutting surfaces of the first and second plastic members are connected to form a spray arm having a continuous bearing slot engaging the outwardly extending flange of the water post. The spray arm is positioned relative to the water post so that the openings of the first and second plastic members are in water flow communication with the openings provided in the water post. Thus, each half of the spray arm is easily and inexpensively molded from plastic and has a bearing member integrally formed therewith. The tongue and groove are also formed during molding and provide a rigid seal between the two halves of the spray arm.

One objective of the present invention is to provide a plastic spray arm having a bearing formed integrally therewith.

Another objective of the present invention is to provide a spray arm that may be easily molded from a plastic material.

Another objective of the present invention is to provide a spray arm that is easily connected to a water post by merely connecting two halves together so as to encircle a cylindrical portion of the water post.

Another objective of the present invention is to provide an inexpensive spray arm that can be easily attached to a water post.

The foregoing objectives and advantages of the invention will appear more fully hereinafter from a consideration of the detailed description which follows, taken together with the accompanying drawings wherein one embodiment of the invention is illustrated by way of example. It is to be expressly understood, however, that the drawings are for illustrative purposes only and are not to be considered as defining the limits of the invention.

DESCRIPTION OF THE INVENTION

Figure 1:
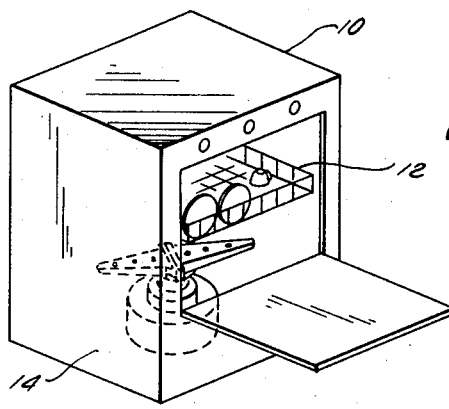
FIG. 1 is a perspective view showing a dishwasher embodying the spray apparatus of the present invention.

A perspective view illustrating the placement of the spray apparatus of the present invention in the bottom of a dishwasher cabinet is shown in FIG. 1. By way of illustration, the dishwasher cabinet 10 contains a rack 12 for stacking of dishes and a spray apparatus 14 positioned below rack 12 at the bottom of the dishwasher cabinet. The drawing in FIG. 1, of course, is greatly simplified for purposes of illustration. In a dishwasher for commercial or home use, more than one rack is generally provided, such as racks for glasses and the like.

Figure 2:
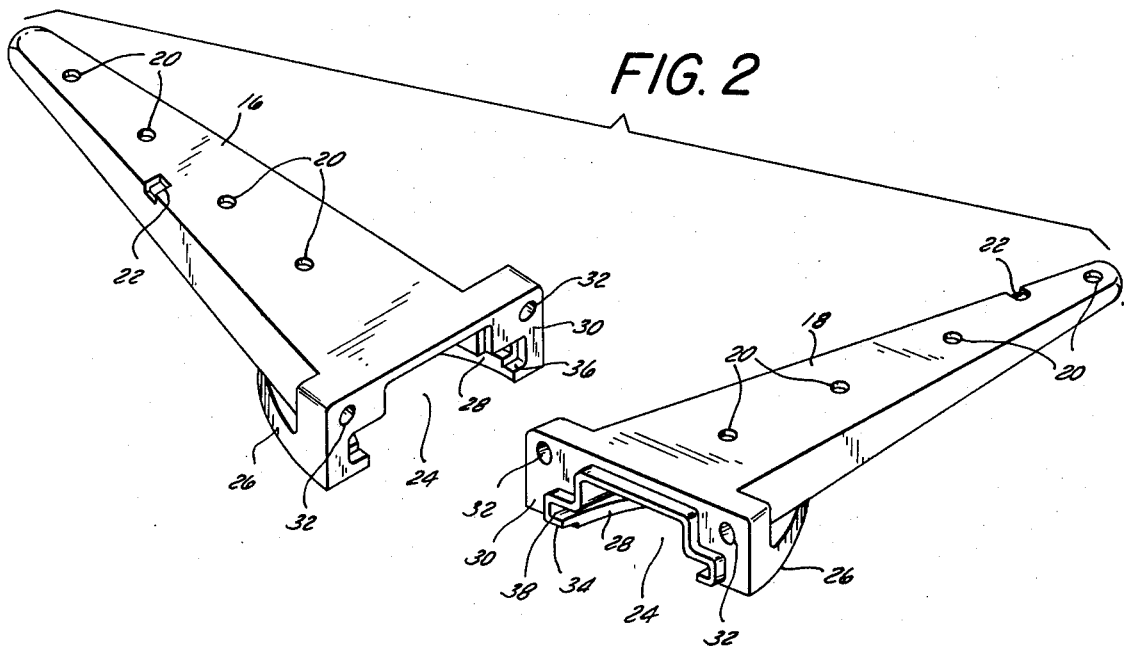
FIG. 2 is an assembly drawing showing how the spray arm is formed from two halves.
Figure 5:
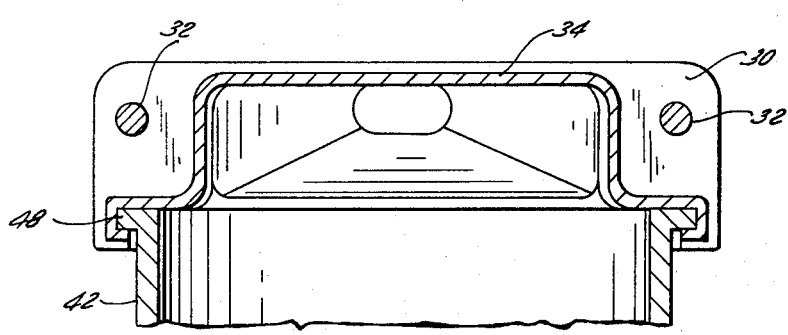
FIG. 5 is a sectional view taken along line 5—5 of FIG. 3.

Referring to FIG. 2, there are shown two members, 16 and 18, each forming one half of a spray arm. Each member is molded from a plastic material, such as Norel SE-100.

Figure 3:
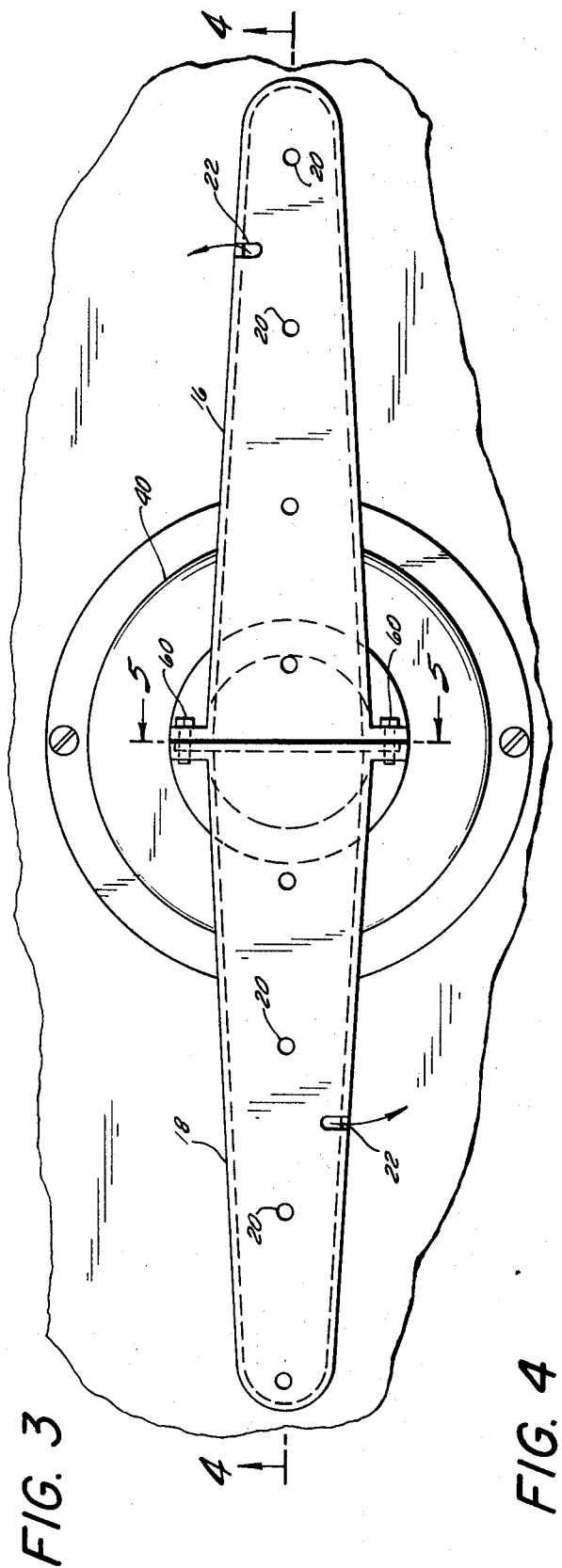
FIG. 3 is a plan view of the spray apparatus of the present invention.
Figure 4:
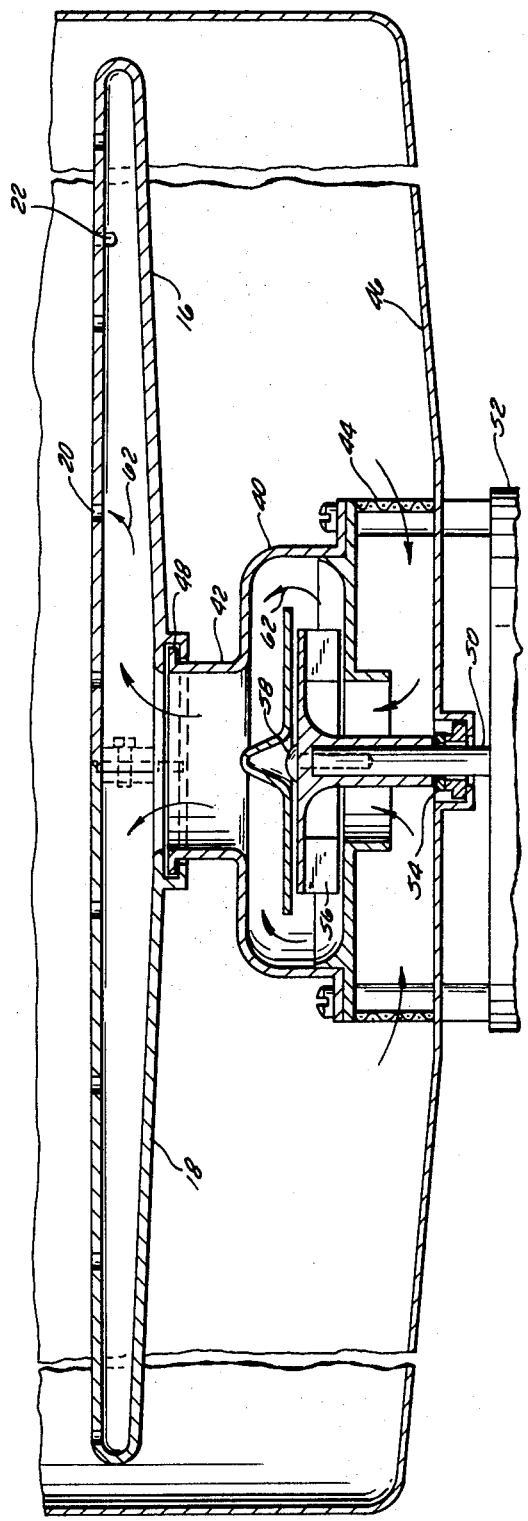
FIG. 4 is a sectional view taken along line 4—4 of FIG. 3.

The plastic from which the members are molded may also contain a lubricating additive or the members may be molded from a self-lubricating plastic such as Acetal or Teflon. Each member has a hollow interior with spray openings 20 extending therefrom to the exterior of the member. An opening 22 is provided in each member and is positioned adjacent to one side so that water emanating therefrom establishes a reactive force to propel the spray arm in a manner well known in the art. Each member has an opening formed in one end shown generally at 24. The bottom wall of each member has a horizontal portion 26 having formed therein a cylindrical surface 28. Each opening 24 is defined by an inner edge of a vertical abutting surface 30 and an inner edge of the cylindrical surface 28. Abutting surfaces 30 have openings 32 formed therethrough. Member 18 has a tongue-shaped member 34 formed on abutting surface 30 adjacent opening 24. Member 16 has a groove 36 formed in abutting surface 30 and positioned adjacent opening 24. A bearing slot 38 is formed in cylindrical surfaces 28 in a horizontal plane. As seen in FIGS. 2, 3 and 4, members 16 and 18 are assembled so that the abutting surfaces 30 of each member are juxtaposed and groove 36 of member 16 receives tongue 34 of member 18 so that cylindrical surface 28 and bearing slot 38 are continuous.

Referring to FIG. 4, there is shown a stationary housing 40 having a vertical wall 42 forming a water post. Screen inlets 44 are provided in the stationary housing adjacent a bottom 46 of a wash chamber of washer 10. Vertical wall 42 has a cylindrical outer surface having an outwardly-extending flange 48 formed thereon.

A shaft 50 driven by a motor 52 is mounted for rotation about a vertical axis by a bearing and seal member 54. An impeller 56 is attached to the end of shaft 50 by a mounting screw 58.

As shown most clearly in FIG. 3, members 16 and 18 are positioned so that flange 48 extends into bearing slot 38 and the abutting surfaces 30 are juxtaposed. The tongue and groove connection between abutting surfaces 30 in conjunction with self-tapping screw members 60 provide a rigid connection and seal between the members forming the spray arm. Bearing slot 38 and flange 48 cooperate to support the spray arm and provide relatively friction-free rotation of the spray arm about the stationary housing 40. Bearing slot 38 and flange 48 also function to provide a seal between the spray arm and the housing 40.

In operation the impeller rotation draws water through screen inlets 44 and then impels the water into housing 40 and into the hollow interior of members 16 and 18 where it is ejected out of spray holes 20 and 22 as illustrated by arrows 62 in FIG. 4.

One embodiment of the present invention has been described; however, the present invention is not limited to the described embodiment, but rather includes obvious modifications thereof. One such modification would include a molded plastic housing having a circumferential groove formed in a cylindrical wall and an inwardly-extending flange formed on a cylindrical surface of the spray arm and extending into the groove.

Thus, the present invention by uniquely forming the spray arm of two separate members facilitates the inexpensive molding of each member from a plastic material. A molding process could not be used if a one-piece spray arm were utilized as in some of the devices of the prior art. Since a molding process is used, the bearing, as well as the tongue and groove, can be integrally formed in the spray arm. Thus, the need for a separate bearing member as required in the devices of the prior art is eliminated. The spray arm is easily connected to the water post by merely placing a member on each side of the water post and connecting the members with screw means 60. Thus, the present invention provides a spray apparatus that is inexpensive to manufacture and is easier to assemble than the devices provided heretofore.

What is claimed is:

1. A dishwasher spray apparatus, comprising:
   an upstanding water post having an outwardly extending circumferential flange;
   first and second arm members formed of molded plastic and having a cylindrical surface with a bearing slot formed therein; and
   means for connecting said arm members to form a spray arm having a continuous cylindrical surface and bearing slot surrounding the flange of the water post, whereby the arm members are rotatably attached to said water post and supported thereby.

2. A dishwasher spray apparatus, comprising:
   a support member having an upstanding cylindrical surface;
   first and second arm members each having a cylindrical surface;
   means for rigidly connecting said first and second arm members to form a spray arm member having a continuous cylindrical surface comprising the cylindrical portions of the first and second arm members, said cylindrical surfaces of the support member and the spray arm member being juxtaposed;
   bearing means integrally formed in one of said cylindrical surfaces; and
   means cooperating with said bearing means and formed on the other of said cylindrical surfaces for rotatably attaching said spray arm member to said support member.

3. An apparatus as described in claim 2, wherein the bearing means comprises a circumferential bearing slot and the means cooperating therewith comprises a flange extending into said slot.

4. An apparatus as described in claim 2, wherein the means for connecting said first and second arm members includes a tongue formed on the first arm member and a groove formed in the second arm member for receiving the tongue of the first arm member.

5. An apparatus as described in claim 2, wherein the member having the bearing means formed therein is molded from plastic.

6. An apparatus as described in claim 2, wherein said first and second members are molded plastic and the bearing means comprises a semicircular groove formed in the cylindrical surfaces of each of the first and second members.

7. In a dishwasher having a wash chamber including a bottom, a spray apparatus comprising:
   a hollow water post mounted in an upstanding position on said bottom, the water post having a first opening adjacent the bottom and a second opening formed in the uppermost end and a cylindrical outer surface about the uppermost end;
   an outwardly extending circumferential flange formed around the cylindrical outer surface of said water post;
   first and second hollow elongated members each including a top wall having spray openings formed therein, a bottom wall, at least a portion of which lies in a horizontal plane, and an opening at one end defined partially by a vertical abutting surface and partially by a cylindrical surface formed in the horizontal portion of the bottom wall and a groove formed in said cylindrical surface to form a bearing and to receive the outwardly-extending flange formed about the water post; and
   means for connecting and sealing together the abutting surfaces of the first and second members to form a spray arm rotatably attached to the water post and supported thereby, so that the spray openings of the hollow elongated members are in water flow communication with the openings formed in the hollow water post.

8. A spray apparatus as described in claim 7, wherein the means for connecting and sealing together the abutting surfaces comprises a tongue member formed in the abutting surface of the first hollow elongated member and a groove formed in the abutting surface of the second elongated hollow member for receiving the tongue of the first member.

9. A spray apparatus, comprising:
   a substantially cylindrical upstanding water post having an outwardly extending circumferential flange formed near the uppermost end;
   first and second hollow elongated members each having a vertical abutting surface at one end and an opening formed in the abutting surface; and
   means connecting said abutting surfaces to form a spray arm from said first and second members, said spray arm having a circular opening in a bottom wall formed by a cylindrical surface, said cylindrical surface having a circumferential bearing slot formed therein for receiving the flange of the water post whereby the spray arm is rotatably attached to the water post.

10. A spray apparatus as described in claim 9, wherein the first and second members are formed of a self-lubricating plastic.

* * * * *